United States Patent [19]
Natchoo

[11] Patent Number: 6,012,829
[45] Date of Patent: Jan. 11, 2000

[54] DEVICE FOR CORRECTING THE ORIENTATION OF THE LIGHT BEAM EMITTED BY A VEHICLE HEADLIGHT

[75] Inventor: Philippe Natchoo, Tournan En Brie, France

[73] Assignee: Valeo Vision, Bobigny, France

[21] Appl. No.: 09/097,574

[22] Filed: Jun. 15, 1998

[30] Foreign Application Priority Data

Jun. 16, 1997 [FR] France .................................. 97 07423

[51] Int. Cl.[7] .................................................. B60Q 1/08
[52] U.S. Cl. ........................ 362/524; 362/513; 362/512; 362/287; 362/427; 362/428
[58] Field of Search .................................. 362/524, 513, 362/512, 287, 427, 428

[56] References Cited

U.S. PATENT DOCUMENTS 5,251,114 10/1993 Cantin et al. ............................ 362/428
5,673,991 10/1997 Eickhoff et al. ........................ 362/513

FOREIGN PATENT DOCUMENTS 2 249 694  4/1974  Germany .
23 39 837  2/1975  Germany .
78 13 545  10/1979  Germany .
29 52 217  7/1981  Germany .

OTHER PUBLICATIONS

French Search Report dated Mar. 13, 1998.

*Primary Examiner*—Sandra O'Shea
*Assistant Examiner*—Ronald E. DelGizzi
*Attorney, Agent, or Firm*—Morgan & Finnegan, L.L.P.

[57] ABSTRACT

A device for correcting the orientation of a motor vehicle headlight beam has a casing containing an electric motor, a rotatable output shaft and a speed reducer working between the motor shaft and the output shaft of the device, for the purpose of making running adjustments to the beam orientation. The device also includes a manual adjusting knob which is rotatable in the casing, with a selective transmission means between the manual knob and the output shaft, for putting the latter into a reference position when the knob is rotated. The speed reducing motor drive is coupled to the output shaft through a dog clutch which is disengaged, to convert the device from electrical to manual operation, by axial declutching movement of the manual knob.

18 Claims, 2 Drawing Sheets

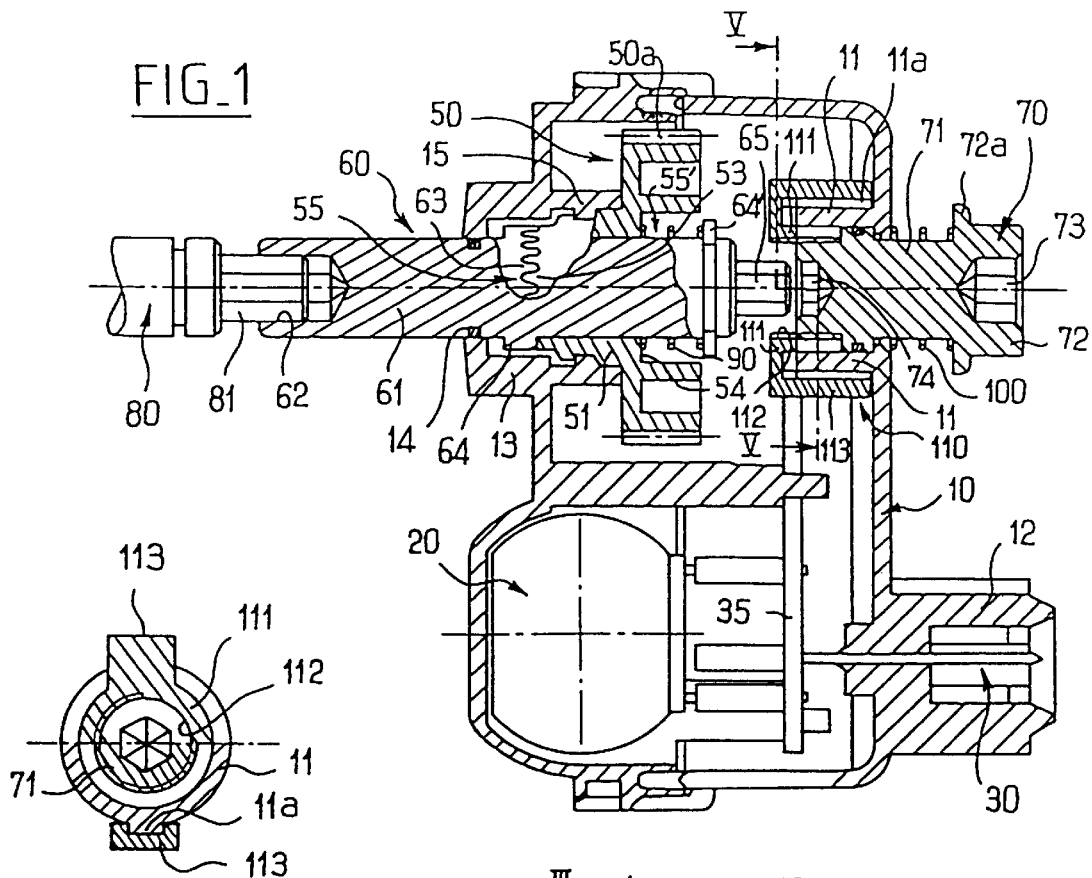
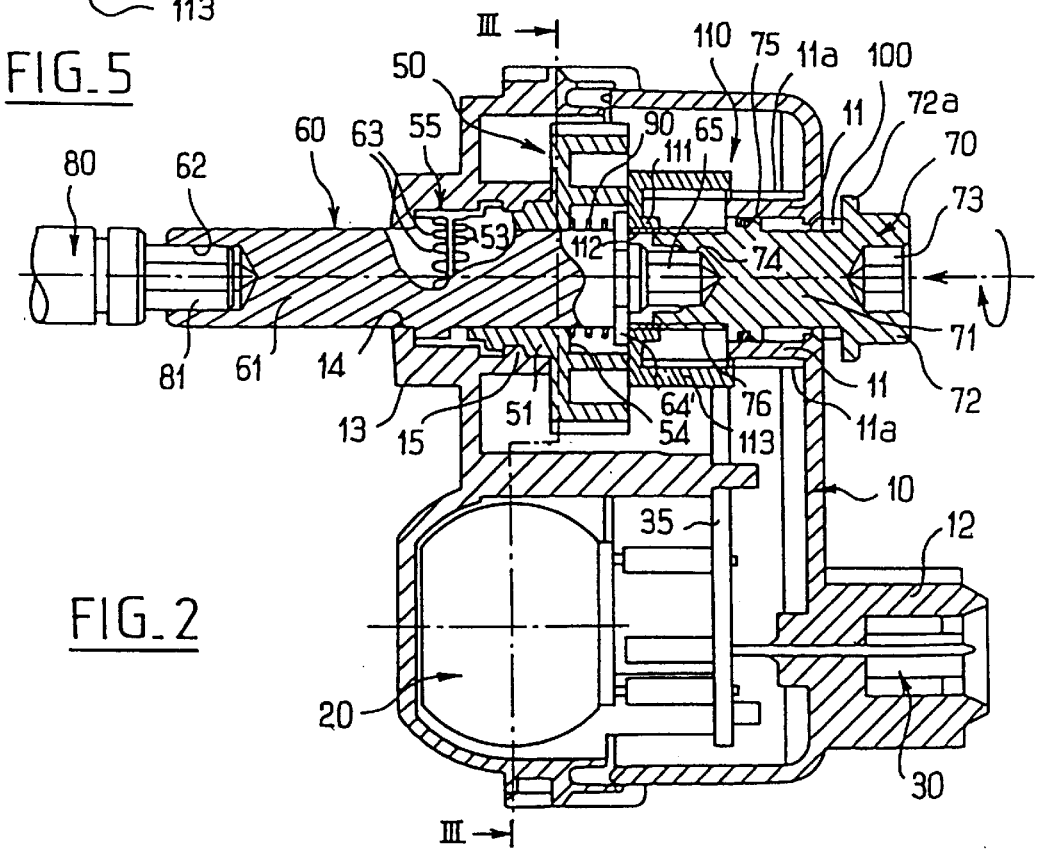

6,012,829

DEVICE FOR CORRECTING THE ORIENTATION OF THE LIGHT BEAM EMITTED BY A VEHICLE HEADLIGHT

FIELD OF THE INVENTION

The present invention relates in general terms to electrical correcting devices, or beam correctors for adjusting the orientation of the light beam or beams emitted by a motor vehicle headlight. More particularly, the invention is directed to a motorized beam corrector having a rotary output element and associated with manual adjusting means for setting the zero or datum orientation of the beam.

BACKGROUND OF THE INVENTION

A rotary output beam corrector conventionally comprises a casing in which an electric motor is mounted. This motor, associated with a speed reducing transmission, drives the output element of the device, in the form of an output shaft projecting from the casing of the device.

This output shaft has a male or female profiled element such as a hexagonal head or socket, which enables the output shaft to be coupled to a threaded control rod which is engaged in a fixed thread secured to the housing of the headlight and in engagement with the reflector of the latter. In this connection, rotation of the output shaft of the corrector causes the control rod to turn and also, by virtue of its screw thread, to be displaced in straight line movement (or translation) so as to cause the reflector to pivot about a fixed point. In this way the orientation of the headlight beam is adjusted. Such adjustment generally consists of horizontal adjustment as a function of variations in the attitude of the vehicle, but it is also possible to envisage azimuth adjustment if desired.

One problem encountered in this type of beam corrector lies in the fact that it has to be associated with additional means for carrying out manually, usually in the factory, adjustment of the reflector so as to put the beams into a reference position or so-called zero position. It is accordingly from this zero position that the electrical correcting device will operate in order to make the running adjustments that become necessary when the vehicle is in use.

The manual zero adjusting means generally consist of a mechanical system located outside the casing of the corrector, and having an adjusting knob accessible from outside and coupled, through suitable means such as cranks, meshing toothed wheels or the like with the output side of the corrector, so as to enable a geometrical parameter of the coupling between the output shaft of the electrical corrector and the control rod of the reflector to be varied. These means are often complicated and difficult to fit, due to the need for fitting both an electrical corrector and a manual corrector, and they increase the selling price of the headlight.

DISCUSSION OF THE INVENTION

An object of the invention is to overcome the above mentioned disadvantages in the current state of the art, by proposing an electrical beam correcting device associated with manual adjusting means having a particularly simple and inexpensive structure.

Another object of the present invention is to provide an integrated beam correcting device which contains, in a common closed casing, both an electrical corrector, for making running adjustments, and a manual corrector for zero adjustment.

According to the invention, a correcting device for adjusting the orientation of the beam emitted by a motor vehicle headlight, comprises a casing which contains an electric motor, a rotary output shaft, and a speed reducing means operating between the output shaft of the electric motor and the output shaft of the device, wherein it further includes a manual adjusting member mounted for rotation in the casing, selective transmission means interposed between the manual adjusting means and the output shaft so as to put the latter into a predetermined reference position by rotary adjusting movement of the said manual adjusting member, and a selective clutch mechanism for coupling the speed reducing means to the output shaft, disengagement of the clutch mechanism being obtained by a declutching movement of the said manual adjusting member, this declutching movement being different from the rotary adjusting movement of the latter.

According to a preferred feature of the invention, the speed reducing means includes a driven toothed wheel disposed coaxially with the output shaft, and the clutch mechanism consists of a dog clutch mechanism arranged operatively between the said toothed wheel and the said output shaft.

The dog clutch mechanism preferably comprises a first set of teeth arranged at the free end of a sleeve element fixed to the toothed wheel and surrounding the output shaft, and a second set of teeth arranged on a collar element fixed with respect to the output shaft.

The manual adjusting member (which is typically a rotary knob) is preferably arranged coaxially with the output shaft, the declutching movement consisting of axial movement of the manual adjusting knob in a straight line, so as to exert an axial applied force on the output shaft.

According to another preferred feature of the invention, the selective transmission means between the manual adjusting member and the output shaft consists of male-female cooperation that takes place in the vicinity of an abutment zone for engagement of the manual adjusting member with the output shaft, the transmission means being engaged when engagement is achieved in the abutment zone.

Preferably, the device includes a first resilient means for biasing the output shaft in a direction corresponding to an engaged state of the dog clutch mechanism. The device preferably also includes a second resilient means for biasing the manual adjusting member towards a position corresponding to an uncoupled state of the said selective transmission.

According to a further preferred feature of the invention, the device includes means for limiting the rotation of the output shaft under the action of the manual adjusting member. This limiting means preferably comprises a stop member or cursor, which is prevented from rotating and which is in engagement with the manual adjusting member through cooperation of the screw and nut type, the said cursor including opposed surfaces which are adapted to come into abutment against two surfaces of the device. These surfaces of the device preferably comprise a zone of the casing of the latter surrounding the manual adjusting member, and a flank, in facing relationship with it, of the toothed wheel.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is a view in axial cross section of a beam correcting device according to the invention, and shows the device ready for motorized running adjustments to be made.

FIG. 2 is a view in axial cross section of the device ready for manual adjustment of its zero or reference setting.

FIG. 5 is a view of a detail of the device, in transverse cross section taken on the line V—V in FIG. 1.

DESCRIPTION OF A PREFERRED EMBODIMENT OF THE INVENTION

Figure 4:
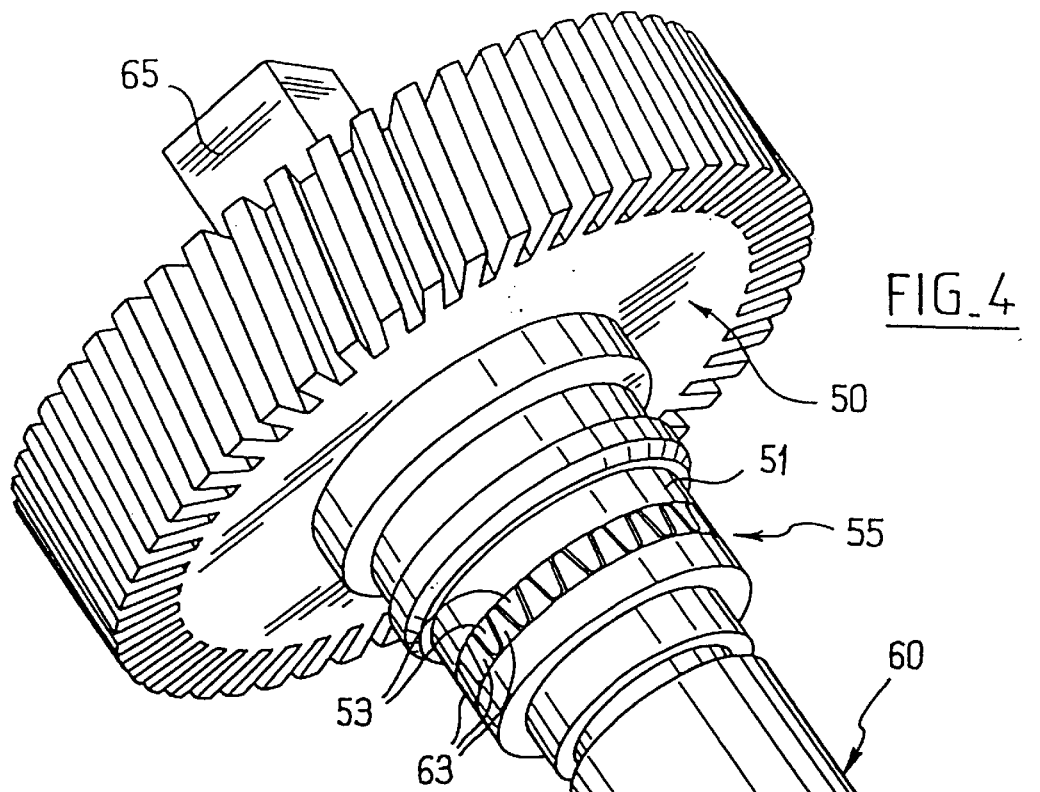
FIG. 4 is a perspective view of part of the device shown in FIGS. 1 to 3.

With reference to the drawings, these show a motorized and manual beam correcting device for adjusting the orientation of the beam of a motor vehicle headlight. In a manner known per se, the correcting device comprises a casing 10 which encloses an electric motor 20. One part 12 of the casing 10 constitutes the body of an electrical connector 30 through which the required control signals are taken to the motor. The correcting device is, if required, provided with a position feedback loop in the form of an electric or electronic circuit formed on a printed circuit 35.

Figure 3:
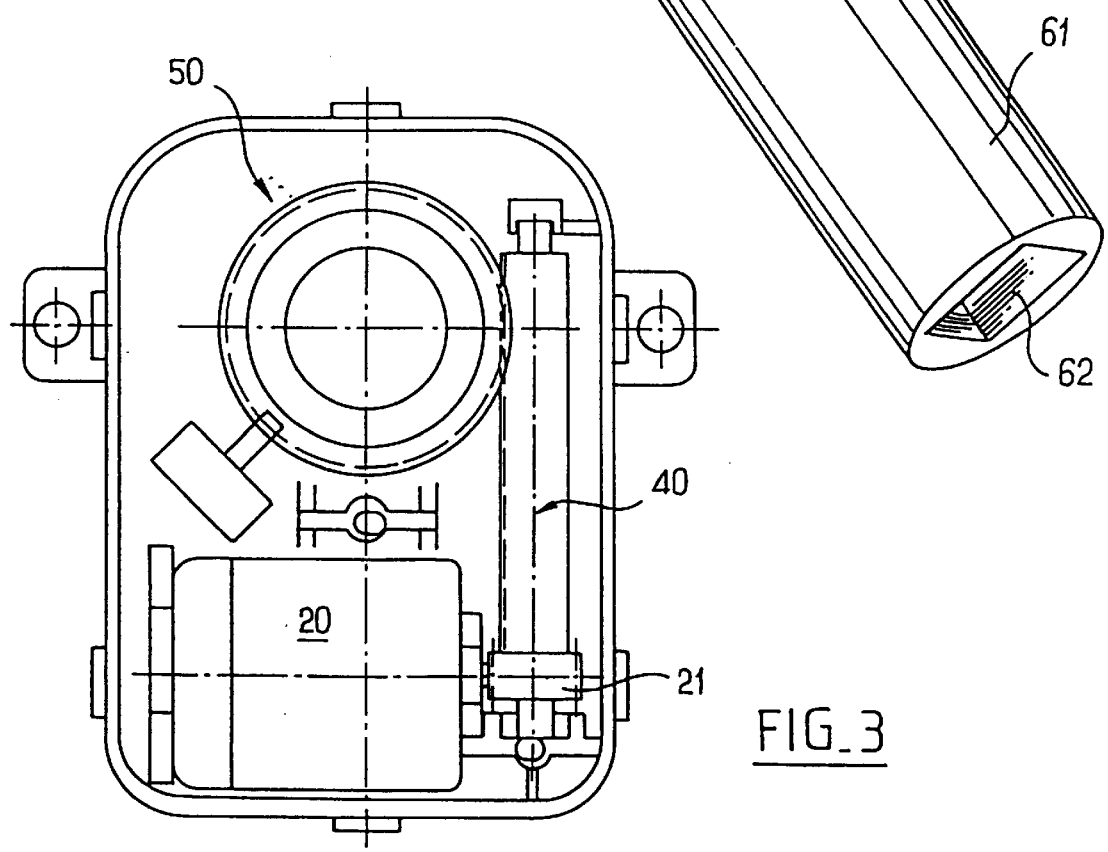
FIG. 3 is a view of the device in transverse cross section taken on the line III—III in FIG. 2.

As shown in FIG. 3, the output shaft of the motor 20 carries a pinion 21 which meshes with a worm 40. This worm 40 itself meshes with a wheel 50 which has a set of external teeth 50a, so as to constitute a reducing gear train.

An output shaft 60 of the correcting device is mounted pivotally in a bearing 14 which is formed in a thickened portion 13 of the casing 12, concentrically with the toothed wheel 50. For this purpose, the toothed wheel 50 is integral with a generally cylindrical sleeve element 51, which closely surrounds the shaft 60 and which is snapfitted within a further cylindrical sleeve element 15 constituting a bearing. The bearing 15 projects within the casing 10 from the thickened portion 13 of the latter.

The output shaft 60 has an outwardly projecting axial portion 61 which terminates at its free end in a hollow socket 62. This socket 62 is for example of hexagonal cross section as shown in FIG. 2, or of square cross section as shown in FIG. 4. The socket 62 is adapted to receive a hexagonal male head 81 of an orientation control rod 80, part of which can be seen in FIGS. 1 and 2. In a manner which is entirely conventional and not shown, the orientation control rod 80 has an external thread which cooperates with a threaded element fixed to the housing of the headlight, such that the rod 80 is displaced in translation when it is driven in rotation by the beam adjusting device, whereby to cause a reflector (not shown) of the headlight to tilt about a fixed engagement point in the usual way.

The output shaft 60 is arranged to slide axially with respect to the toothed wheel 50, being guided in this sliding movement by the sleeve element 51 of the toothed wheel.

A dog clutch mechanism is arranged between the toothed wheel 50 and the output shaft 60. This mechanism, which is generally indicated by the reference numeral 55, has one set of teeth 53, which project towards the left in FIGS. 1 and 2, at the free end of the sleeve element 51 of the toothed wheel 50, together with another set of teeth 63, which project towards the right in FIGS. 1 and 2 and which are arranged on a collar portion 64 integral with the output shaft 60. These teeth 53 and 63 are arranged to interpenetrate selectively with each other as will be seen in detail later herein, so as to couple together the toothed wheel 50 and the output shaft 60 for rotation together.

In the operating mode shown in FIG. 1, the beam correcting device operates as a conventional motorized corrector for making running adjustments, with rotation of the motor 20 causing corresponding rotation of the output shaft 60 at a reduced speed.

As will be seen in FIGS. 1 and 2, in the inner end region of the output shaft 60, there is a radial collar 64' followed by a terminal head 65, which in this example consists of a male profiled element. The head 65 is hexagonal as in FIGS. 1 and 2, or square as in FIG. 4.

A helical compression spring 90 is retained around the output shaft 60 between the collar 64' and the base wall 54 of a cavity 55', which is formed in the central region of the toothed wheel 50. This spring 90 therefore tends, in a rest position of the device, to hold the teeth 53 of the dog clutch mechanism 55 in engagement with the teeth 63. The disengagement of these sets of teeth from each other will be described later herein.

The beam correcting device also includes a manual adjusting knob 70 which is rotatable in a bearing 11, while being able to slide axially in the bearing 11. This bearing consists of a sleeve portion of the casing 10, projecting into the interior of the latter. The knob 70 is mounted so that it can rotate about the same axis as the toothed wheel 50 and the output shaft 60. The knob 70 comprises a body 71 and a head 72, in which a hollow socket 73, which may for example be hexagonal, is formed for receiving a manual adjusting tool, although adjustment may also be carried out by a person using their fingers.

A compression spring 100 is interposed between a collar portion 72a, arranged at the base of the head 72 of the adjusting knob, and the outer face of the casing around the aperture through which the body 71 of the adjusting knob passes.

The body 71 of the knob 70 has an intermediate portion of enlarged diameter, in which a groove is formed for receiving an O-ring seal 75 which cooperates with the internal surface of the bearing 11. The knob body 71 also has, in the radial end face of its end which faces towards the output shaft 60, a hollow socket 74 which is arranged to receive the male head 65 of the output shaft 60, as will be seen later herein. The body 71 of the knob 70 has a screw thread 76 which is located so as to surround the socket 74.

It will be noted here that the collar portion 72a and the radial portion of the knob 70 carrying the O-ring seal 75 define the sliding movements of the adjusting knob 70.

A stop member 11 0 is provided for limiting rotation of the knob 70. This stop member comprises a cylindrical central portion 111 in which a thread 112 is formed, this thread 112 cooperating with the screw thread 76 of the adjusting knob. The stop member 110 also has two longitudinal, diametrically opposed, wing portions 113, consisting of an upper wing portion and a lower wing portion. As can be seen in FIG. 5, each wing portion 113 has a generally U-shaped profile which is open towards the central axis of the stop member 110. Each of these wing portions 113 is in engagement with a respective longitudinal rib 11a. These ribs 11a are formed on the fixed sleeve 11, respectively above and below the bearing defined by the sleeve 11, so that the stop member 110 is able to slide, with the adjusting knob 70, along its axis, but is prevented from rotating.

It will be noted here that the translational, or straight line, movement of the stop member 110 is limited, firstly towards the right by the free ends of the wing portions 113 coming into abutment against the internal face of the casing 10, and, secondly, towards the left by the front face (i.e. the left hand face) of the stop member 110 coming into abutment against the flank of the toothed wheel 50 that faces towards the said front face.

A beam corrector such as that described above is fixed on the housing of a vehicle headlight, in such a way that its manual adjusting knob 70 is accessible from outside the housing.

The way in which a beam correcting device having the structure described above operates, and how it is used, will now be described.

The rest position of the device is shown in FIG. 1. In this position, the spring 90 biases the output shaft 60 towards the right, so that the dog clutch mechanism is engaged. At the same time, the compression spring 100 biases the adjusting knob 70 towards the right so that the head 65 of the output shaft 60 is not in engagement with the corresponding female socket 74. The output shaft 60 and the knob 70 are thus uncoupled from each other.

In this rest position, running adjustments of beam orientation can be carried out by rotation of the electric motor 20, which drives the output shaft 60 through the pinion 21, the worm 40, the toothed wheel 50 and the dog clutch mechanism 55, so that the shaft 60 is rotated (at a reduced angular speed) in the same way as in a conventional rotary-output beam correcting device.

The state of the device shown in FIG. 2 corresponds to the case of manual adjustment of the output shaft 60 so as to put it into a reference or "zero" position corresponding to a predetermined orientation of the beam emitted by the headlight.

This manual adjustment is carried out by first exerting on the manual adjusting knob 70 an axial pressure towards the left in FIG. 2, over a course of travel of the knob which is defined by the maximum compression of the spring 100. In this compressed position, the head 65 of the output shaft 60 is engaged in the hollow socket 74 in such a way that the knob 70 and the output shaft 60 become coupled together in rotation.

At the same time, and once the head 65 has come into abutment with the base of the socket 74, this pressure exerted on the knob 70 also pushes the output shaft 60 towards the left, over a distance such that the teeth 53 and 63 of the dog clutch mechanism 55 become disengaged from each other. As a result, the output shaft 60 is no longer coupled to the toothed wheel 50. In this situation, the effect of any rotation exerted on the adjusting knob 70 is to rotate the output shaft 60, and thereby to adjust the axial position of the control rod 80 of the headlight so as to give the desired reference setting.

It will be noted here that the purpose of the stop member 110 is to limit the course of angular displacement of the manual adjusting knob 70 and control rod 60 during manual adjustment operations, so as not to drive the reflector of the associated headlight towards positions lying outside the range of its permissible positions. This limitation of travel is produced due to the fact that rotation of the adjusting knob 70, besides causing the shaft 60 to rotate, also causes the stop member 110 to be displaced axially due to the threaded (screw and nut type) engagement between the knob 70 and the member 110.

When the knob 70 is turned clockwise (the device being observed from the right in FIG. 2), this tends to displace the stop member 110 towards the right, and this movement can take place only until the free ends of the two wing portions 113 come into abutment against the casing 10. Once they have so come into abutment, the rotation of the knob 70 in the same direction cannot be further continued, and a first limit on the course of travel of the output shaft 60 is obtained.

In the opposite direction, anticlockwise rotation of the knob 70 causes the stop member 110 to be displaced axially towards the left in FIG. 2. This movement is limited by the left-hand face of the stop member 110 coming into abutment against the right-hand face of the toothed wheel 50. Once this abutment has been achieved, the knob 70 will tend by reaction to be displaced towards the right if rotation is continued, until the head 65 of the output shaft 60 is no longer in engagement with the corresponding socket 74. As a result of this, the knob 70 is no longer capable of driving the output shaft 60 in rotation, and a second limit is thereby placed on the angular travel of the latter.

The present invention is of course in no way limited to the embodiment described above and shown in the drawings, but a person skilled in this technical field will be able to apply to it any variation or modification that conforms with the spirit of the invention.

What is claimed is:

1. A correcting device for adjusting the orientation of a beam emitted by a headlight, the device comprising:
   a casing;
   a motor housed in the casing the motor including a motor shaft;
   a rotatable output shaft carried by the casing;
   speed reducing means disposed in the casing, the speed reducing means connecting the motor shaft with the output shaft;
   a manual adjusting member;
   mounting means, in the casing, for mounting the manual adjusting member rotatably in the casing;
   selective transmission means operatively connected between the manual adjusting member and the output shaft, the selective transmission means enabling adjustment of the output shaft to a predetermined reference position through rotational movement of the manual adjusting member;
   a selective clutch mechanism comprising a first clutch element carried by the output shaft and a second clutch element for releasable engagement with the first clutch element, the mounting means adapted to enable the manual adjusting member to perform a declutching movement different from the rotational movement of the manual adjusting member; and
   means for connecting the second clutch element to the manual adjusting member through the declutching movement of the manual adjusting member to disengage the clutch elements from each other.

2. The correcting device according to claim 1, wherein the speed reducing means comprises a driven toothed wheel coaxial with the output shaft, the clutch mechanism being a dog clutch mechanism operatively connected between the toothed wheel and the output shaft.

3. The correcting device according to claim 2, further comprising a collar portion carried on the output shaft, wherein the toothed wheel includes a sleeve element surrounding the output shaft and having a free end defining a first set of teeth, the collar portion defining a second set of teeth, the first and second sets of teeth comprising the first and second clutch elements, respectively.

4. The correcting device according to claim 2, wherein the manual adjusting member is coaxial with the output shaft, the mounting means further adapted to enable axial straight line movement of the the manual adjusting member in the casing, the axial movement corresponding to the declutching movement, the manual adjusting member through the declutching movement exerting an axial applied force on the output shaft.

5. The correcting device according to claim 4, wherein the selective transmission means, between the manual adjusting member and the output shaft, comprises a male element associated with one of the manual adjusting member and the output shaft and a female element associated with the other of the manual adjusting member and the output shaft, the male and female elements cooperating to engage the manual adjusting member with the output shaft at an abutment zone.

6. The correcting device according to claim 2, further including first resilient means, adapted to engage the output shaft, for biasing the output shaft in a direction corresponding to engagement of the dog clutch mechanism.

7. The correcting device according to claim 1, further including second resilient means, adapted to engage the manual adjusting member, for biasing the the manual adjusting member towards a position corresponding to an unconnected state of the selective transmission means.

8. The correcting device according to claim 1, further including stop means for limiting rotation of the output shaft under the action of the manual adjusting member.

9. The correcting device according to claim 8, further comprising a first stop surface and a second stop surface, wherein the manual adjusting member is coaxial with the output shaft, the mounting means adapted to enable axial straight line movement of the manual adjusting member in the casing, the axial movement corresponding to the declutching movement, the manual adjusting member through the declutching movement exerting an axial applied force on the output shaft, and wherein the stop means comprises a cursor, the device further including means, carried by the casing, for engaging the cursor to prevent rotation of the cursor, the cursor and the manual adjusting member having inter-engaging screw threads to connect the cursor and the manual adjusting member for relative axial movement, the cursor including two opposing surfaces for abutment against the first and second stop surfaces, respectively.

10. The correcting device according to claim 9, wherein the first stop surface comprises a zone of the casing surrounding the manual adjustment member and the second stop surface comprises a flank of the toothed wheel in facing relationship with the first surface.

11. The correcting device according to claim 1, wherein said correcting device is disposed within a headlight.

12. A correcting device for adjusting the orientation of a beam emitted by a headlight, the device comprising:

a casing;

a motor housed in the casing, the motor including a motor shaft;

an output shaft movably mounted in the casing;

a first clutch element connected to the output shaft and a second clutch element operatively connected to the motor shaft, the first and second clutch elements adapted to engage each other at a clutched condition and to disengage from each other at a declutched condition; and a manual adjusting member movably mounted in the casing, the manual adjusting member movable in a first direction to engage the output shaft and to cause disengagement of the first and second clutch element to the declutched condition and in a second direction, different than the first direction, to adjust the engaged output shaft to a predetermined reference position.

13. The device according to claim 12, further comprising a first resilient means, associated with the output shaft, for biasing the output shaft to a clutched condition.

14. The device according to claim 12, further comprising a second resilient means, associated with the manual adjusting member, for biasing the manual adjusting member in a direction, opposite the first direction, to disengage the manual adjusting member from the output shaft.

15. The correcting device according to claim 12, wherein the correcting device is disposed within a headlight.

16. A correcting device for adjusting the orientation of a beam emitted by a headlight, the device comprising:

a casing;

a motor housed in the casing, the motor including a motor shaft;

an output shaft movably mounted in the casing;

a first clutch element connected to the output shaft and a second clutch element operatively connected to the motor shaft, the first and second clutch elements adapted to engage each other at a clutched condition and to disengage from each other at a declutched condition; and means, movably mounted in the casing, for manually adjusting the output shaft to a predetermined reference position, the means for manually adjusting movable in a first direction to engage the output shaft and to cause disengagement of the first and second clutch elements to the declutched condition and in a second direction, different than the first direction, to adjust the engaged output shaft to the predetermined reference orientation.

17. The device according to claim 16, further comprising means, associated with the output shaft, for biasing the output shaft to a clutched condition.

18. The device according to claim 16, further comprising means, associated with the means for manually adjusting, for biasing the means for manually adjusting in a direction, opposite the first direction, to disengage the means for manually adjusting from the output shaft.

* * * * *

UNITED STATES PATENT AND TRADEMARK OFFICE
CERTIFICATE OF CORRECTION

PATENT NO. : 6,012,829
DATED : January 11, 2000
INVENTOR(S) : Philippe Natchoo

It is certified that error appears in the above-indentified patent and that said Letters Patent is hereby corrected as shown below:

In claim 1, column 6, line 22, please insert --,-- after "casing".

Signed and Sealed this

Third Day of April, 2001

NICHOLAS P. GODICI

*Attest:*

*Attesting Officer*     *Acting Director of the United States Patent and Trademark Office*